Jan. 31, 1950
D. H. WIESE
2,496,188
APPARATUS FOR SEAM WELDING OF TUBING
Filed March 10, 1947
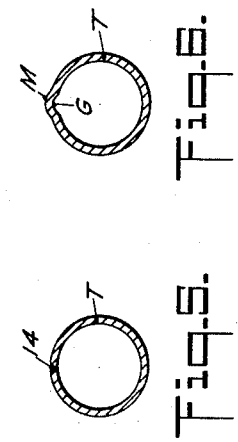
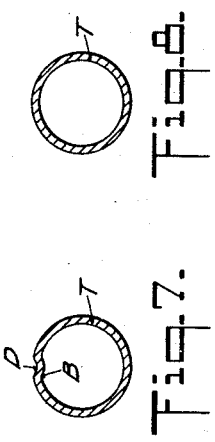
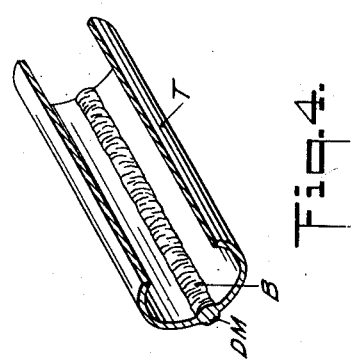
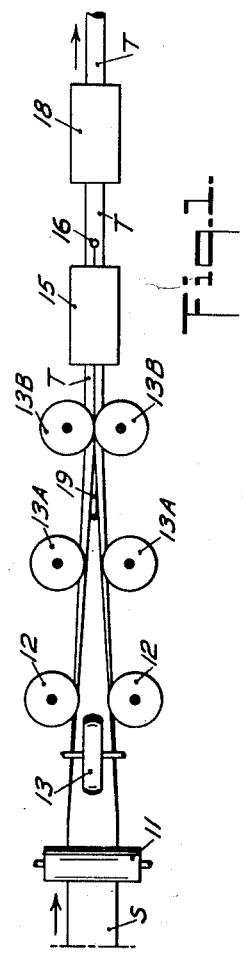
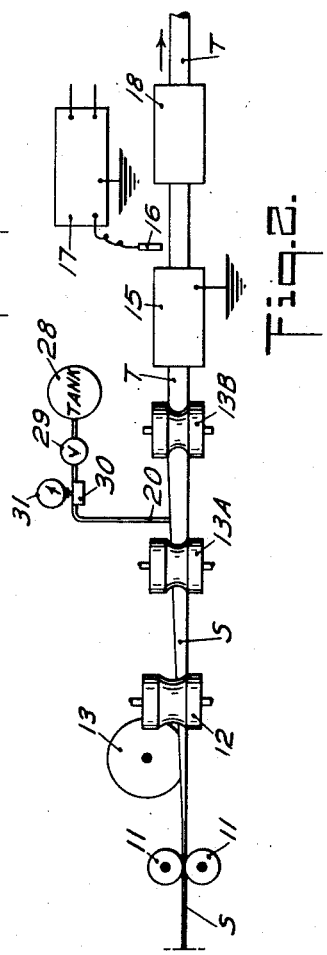
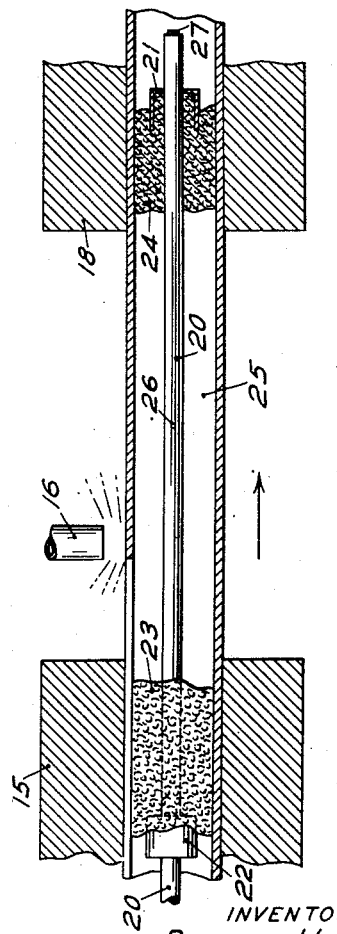
INVENTOR
DONALD H. WIESE
BY
Woodcock and Phelan
ATTORNEYS Patented Jan. 31, 1950

2,496,188

UNITED STATES PATENT OFFICE 2,496,188

APPARATUS FOR SEAM WELDING OF TUBING

Donald H. Wiese, Norristown, Pa., assignor to Superior Tube Company, Norristown, Pa., a corporation of Pennsylvania Application March 10, 1947, Serial No. 733,538

2 Claims. (Cl. 113—59)

This invention relates to the manufacture of welded-seam tubing, and is particularly concerned with avoidance of structural weakness of the tubing at or adjacent the seam.

In the manufacture of tubing from strip stock, the strip is bent into a tube of the desired shape, usually circular, and the open seam formed by the original edges of the strip is then closed by welding to form a circumferentially continuous tube. As an incident of the prior methods of welding, the resulting seam includes a bead extending along the seam interiorly of the tube. In the subsequent cold drawing of the tubing to size, the presence of the internal bead is responsible for the production of crevice lines in the weld and the resulting tubing is inherently weak along the fusion line or seam. This characteristic of welded-seam tubing has heretofore limited its field of use and has been largely responsible for the splitting or fracturing of welded tubing in use and even during steps of its manufacture subsequent to the seam-closing welding step. Attempts have been previously made to prevent formation of the internal bead, but so far as known, none of them, prior to the present invention, has been successful, and were abandoned because introducing even more serious faults or mechanical problems difficult or impossible to solve or control.

In accordance with the present invention, the formation of an internal bead is minimized or eliminated by substantially counteracting the effect of gravity upon the molten seam-forming metal by providing and maintaining a proper differential between the gas pressure internally and externally of the section of tubing being welded. More specifically, the tubing is internally blocked on opposite sides of the welding point or station by soft heat-resistant plugs which shape themselves into conformity with the tubing to define a substantially closed chamber to which is supplied gas under pressure suitable to support the under face of the molten pool and so prevent formation of an internal bead along the seam line.

The invention further resides in systems having features of novelty and utility hereinafter described.

For more detailed understanding of the invention, reference is made to the accompanying drawings in which:

Figs. 1 and 2 are plan and side elevational views schematically illustrating a tube forming system;

Fig. 3 is a detail sectional view, on enlarged scale, of parts appearing in Figs. 1 and 2;

Fig. 4 is a perspective view of a cut-away section of tubing made by the prior art method;

Figs. 5 to 8 are cross sectional views of tubing referred to in discussion of practice of the invention.

Referring to Fig. 1 as illustrative of a system embodying and utilizing the invention, the strip S of beryllium-copper, aluminum, magnesium, stainless steel, or other non-ferrous or ferrous metal or alloy suited for making of welded tubing, is fed, as by means including the rolls 11, from a roll or other suitable supply thereof to a first forming station at which the side rolls 12 and top roll 13 cooperate to turn the marginal edges of the strip upwardly from the horizontal position to form the strip into a shallow U. The strip is drawn through several additional forming stations generically represented by the pairs of rolls 13A—13A, 13B—13B at each of which a further shaping step is performed until eventually, as at a station represented by the apertured external-shaping block 15, the original edges of the strip are in contact, Fig. 5, having between them a V-shaped notch or gap 14 forming an open seam extending longitudinally of the tubing T.

Beyond the shaping block or external die 15, or equivalent, the tubing T passes adjacent a welding electrode 16 so disposed that the metal at and adjacent the seam 14 is rendered molten or fluid to close the seam. As the tubing passes beyond the electrode, the molten metal rehardens assisted by artificial cooling as it passes through and beyond the second shaping block 18.

As thus far described, the system is a conventional one producing tubing which, as above stated, is characteristically subject to splitting and fracture. At the welding station, the molten metal tends to sag under the influence of gravity, so that when it rehardens, the seam, as shown in Fig. 4, has a pronounced internal bead B. The seam ordinarily also has an external bead DM, usually convex or upset as shown in Fig. 4, though sometimes concave depending upon the pressure exerted on the tubing by the squeeze rolls and other conditions not of interest here. The internal bead B persists even after numerous subsequent drawing operations; additionally and of greater significance, during the drawing operations and because of the bead, there are set up strains parallel to the seam which cause the tubing to split open, sometimes during the drawing operations and sometimes later in use of the tubing, particularly if subjected to flexure or bending.

In accordance with the present invention, formation of an internal bead is inhibited by supporting the molten metal at the welding station by a gas cushion which is under pressure suitable to prevent the molten metal from sagging into the interior of the tubing and which produces no scraping or scarifying action which would impair the strength of the seam. As shown most clearly in Fig. 1, at a region 19 suitably in advance of the point where the original marginal edges of the strip S come into abutting relation, there is introduced into the interior of the tubing a small pipe 20 which extends through and suitably beyond the welding zone, Fig. 3. The caps 21 and 22, or equivalent, serve to hold two masses of soft heat-resistant material, such as asbestos wool, or equivalent, in position to form two plugs 23, 24, one on either side of the welding station. The two plugs shape themselves into conformity with the tubing to define a zone 25 which is substantially isolated by the plugs from the adjacent sections of tubing and from the external atmosphere. A suitable gas is supplied to pipe 20 and escapes therefrom through one or more openings 26 into the substantially isolated zone 25, the far end of the tube 20 being closed by any suitable means, such as a plug 27. There is some leakage of the gas from zone 25, particularly through the unclosed portion of the seam in advance of the welding electrode 16, so that it is necessary to supply the gas continuously at rate sufficient to maintain the desired pressure within the zone 25. This leakage is not excessive because the block 15 is effective to hold the seam edges of the tubing in contact with each other until they are permanently joined by the weld. There is also some slight inherent leakage through the plugs 23, 24.

The pressure required to prevent formation of an internal bead can be determined empirically for a particular wall thickness and rate of feed of the tubing or the operator may regulate the pressure for that purpose. When the pressure within the zone 25 is too low, the operator will observe a slight depression D along the seam line, Fig. 7, indicating that the molten pool is sagging into the interior of the tube forming an internal bead B which in subsequent drawing operations will produce fault lines, greatly weakening the tubing. If the internal pressure is substantially higher, the operator will observe an external bead or mound M, indicating that there is an internal groove G, Fig. 6, along the seam line. With an external bead such as shown in Fig. 6, there is no excess metal to be folded over or displaced in the subsequent cold drawing and no crevice lines are produced by the drawing. The tubing of Fig. 6 is therefore much superior to that of Fig. 7. At an intermediate optimum value, the gas pressure within the zone 25 just balances the weight of the molten seam-forming metal and holds it in conformity with the shape of the rest of tubing, so that when the metal rehardens, there is little or no deformation or dissymmetry of the wall at or adjacent the seam, Fig. 8. Consequently, in subsequent drawing operations, there are no abnormal strains or stresses localized along the seam line and the finished tubing in appearance and structural strength closely approximates seamless tubing and in any event is suitable for many uses for which welded-seam tubing made by prior methods was unsuited. The bead contour shown in Fig. 8 is ideal for cold drawing; that of Fig. 6 is also good and far superior to that of Fig. 7.

The welding is preferably done electrically and, at least for tubing whose thickness is small compared to the diameter, the arc electrode or electrodes generically represented by electrode 16 is of metal, such as tungsten, which is not to an appreciable extent consumed during the welding operation, that is, the seam-forming metal is the metal of the tubing itself.

The gas or mixture of gases used to support the molten metal within the zone 25 should be one which is practically insoluble in the molten seam-forming metal; for example, for seam-welding of beryllium-copper tubing, the gas may be argon, helium, hydrogen, or the like, or mixtures of them. Slight leakage of such gas through the seam at the welding point is beneficial in that it tends to prevent oxidation of the molten seam-forming metal and so preserves its desired composition; excess leakage at this point should, however, be avoided to prevent disturbance of the arc and consequent impairment of the quality of the weld. The gas may be supplied from a tank 28 provided with a valve 29 adjustable by the operator to regulate the pressure, as observed on the gage 31, at which it is supplied to the zone 25 of the tubing or the valve 29 may be a simple shut-off valve, and the pressure automatically regulated at any desired preset value by a pressure regulator 30 of any suitable type. By way of example, in welding, beryllium-copper tubing having a wall thickness of .050 inch, the gas is supplied under pressure of about $\tfrac{1}{16}$ inch (water column pressure) when the tubing is fed at five feet per minute. The proper pressure depends upon the temperature or fluidity of the molten metal and for any given set of conditions may readily be determined as above described in discussion of Figs. 6 to 8, inclusive.

It shall be understood the invention is not limited to the particular system shown, but that changes and modifications may be made within the scope of the appended claims.

What is claimed is:

1. Apparatus for closing the seam of metal tubing consisting of soft heat-resistant plugs internally engaging and continuously yieldingly conforming with said tubing at regions spaced longitudinally thereof to define an isolated zone, means for applying heat to the seam edges to melt them within the limits of said zone, and means for supplying gas under pressure to said zone to support the seam-forming metal while molten comprising a small tube extending longitudinally of said tubing and through one of said plugs, said small tube being attached to both of said plugs to maintain them in spaced relation defining said zone and being perforate between said plugs.

2. Apparatus for closing the seam of metal tubing consisting of an elongated tube for disposition internally of said tubing and having at least one side opening for discharge of gas, heat-resistant plugs secured to and supporting said elongated tube at spaced points longitudinally thereof on opposite sides of said opening, said plugs being of soft material which shapes itself into conformity with the internal wall of said tubing to define and maintain an isolated zone therein, means for applying heat to the seam edges to melt them within the limits of said zone to form a closed seam not scraped or scarified by said soft plug material, and means for supplying gas to said tubing under pressure maintaining within said zone a gas cushion which supports the molten seam-forming metal.

DONALD H. WIESE.

REFERENCES CITED

The following references are of record in the file of this patent:

UNITED STATES PATENTS

| Number | Name | Date |
|---|---|---|
| 1,552,369 | White | Sept. 1, 1925 |
| 1,711,151 | Lincoln | Apr. 30, 1929 |
| 1,749,765 | Hendrickson | Mar. 11, 1930 |
| 2,092,003 | Mitchell | Sept. 7, 1937 |
| 2,179,176 | Dunn | Nov. 7, 1939 |
| 2,422,305 | Kopec | June 17, 1947 |
| 2,433,296 | Schaefer | Dec. 23, 1947 |